(12) United States Patent
Oshima

(10) Patent No.: US 10,414,109 B2
(45) Date of Patent: Sep. 17, 2019

(54) TIRE VULCANIZING MOLD, TIRE MANUFACTURING METHOD, AND TIRE

(71) Applicant: BRIDGESTONE CORPORATION, Tokyo (JP)

(72) Inventor: Masatomo Oshima, Ogawahigashi-machi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 318 days.

(21) Appl. No.: 15/116,440

(22) PCT Filed: Jan. 14, 2015

(86) PCT No.: PCT/JP2015/050721
§ 371 (c)(1),
(2) Date: Aug. 3, 2016

(87) PCT Pub. No.: WO2015/118910
PCT Pub. Date: Aug. 13, 2015

(65) Prior Publication Data
US 2017/0008243 A1 Jan. 12, 2017

(30) Foreign Application Priority Data
Feb. 4, 2014 (JP) .................................. 2014-019295

(51) Int. Cl.
*B29D 30/06* (2006.01)
*B29C 33/42* (2006.01)
(Continued)

(52) U.S. Cl.
CPC .......... *B29D 30/0606* (2013.01); *B29C 33/42* (2013.01); *B60C 15/0206* (2013.01);
(Continued)

(58) Field of Classification Search
CPC .... B29D 2030/0612; B29D 2030/0617; B29D 2030/0621; B29D 2030/0626;
(Continued)

(56) References Cited

U.S. PATENT DOCUMENTS 1,349,721 A   8/1920  Hopkinson
4,014,632 A * 3/1977  Golz .................. B29D 30/0606
                                                    425/28.1
(Continued)

FOREIGN PATENT DOCUMENTS

EP   0 368 546 A1   5/1990
EP   1 506 852 A1   2/2005
(Continued)

OTHER PUBLICATIONS

Toji Tsujimoto, JP-2005178333 machine translation. (Year: 2005).*
(Continued)

*Primary Examiner* — Robert C Dye
*Assistant Examiner* — Sedef E Paquette
(74) *Attorney, Agent, or Firm* — Sughrue Mion, PLLC

(57) ABSTRACT

A tire vulcanizing mold for molding an unvulcanized tire into a pneumatic tire having a bead part with a bead heel part is provided with a side part ring for molding at least the bead part. A circumferential groove part extending in the tire circumferential direction is formed on a tire molding surface of the side part ring in a heel molding region for molding the bead heel part, the side part ring is divided into a side ring and a bead ring that abuts against the side ring, the division position of the tire molding surface of the side ring and the tire molding surface of the bead ring is located in the groove bottom of the circumferential groove part, and the cross-sectional shape of the circumferential groove part tapers toward the groove bottom.

4 Claims, 8 Drawing Sheets

(51) Int. Cl.
  *B60C 15/02* (2006.01)
  *B29K 105/24* (2006.01)

(52) U.S. Cl.
  CPC .... *B29C 33/424* (2013.01); *B29D 2030/0612* (2013.01); *B29D 2030/0617* (2013.01); *B29D 2030/0621* (2013.01); *B29D 2030/0626* (2013.01); *B29K 2105/246* (2013.01)

(58) Field of Classification Search
  CPC ...... B29D 2030/2664; B29D 2030/487; B29D 30/32; B29D 30/48; B29D 30/0606; B29C 33/42; B29C 33/424; B60C 15/00; B60C 15/0206; B60C 15/0236; B60C 15/024; B60C 15/0242; B60C 2015/0245; B29K 2105/246
  USPC ...... 152/539; 156/130.7, 131, 136; 425/28.1
  See application file for complete search history.

(56) References Cited

U.S. PATENT DOCUMENTS

| | | |
|---|---|---|
| 2002/0185204 A1 | 12/2002 | Matsunaga |
| 2013/0330433 A1 | 12/2013 | Hakoshima |
| 2015/0097314 A1* | 4/2015 | Sasaki ................ B29D 30/0606 264/326 |

FOREIGN PATENT DOCUMENTS

| | | | |
|---|---|---|---|
| JP | 6-234124 A | | 8/1994 |
| JP | 2005-53003 A | | 3/2005 |
| JP | 2005144901 A | * | 6/2005 |
| JP | 2005-178333 A | | 7/2005 |
| JP | 2008-37053 A | | 2/2008 |
| JP | 2011-16327 A | | 1/2011 |
| JP | 2012-166460 A | | 9/2012 |
| JP | 2012-236303 A | | 12/2012 |
| WO | 02/14042 A1 | | 2/2002 |

OTHER PUBLICATIONS

Narishiro Yoshioka, JP-2005144901, machine translation. (Year: 2005).*

International Search Report for PCT/JP2015/050721 dated Apr. 14, 2015 [PCT/ISA/210].

Communication dated Feb. 8, 2017 from the European Patent Office in counterpart Application No. 15747065.9.

* cited by examiner

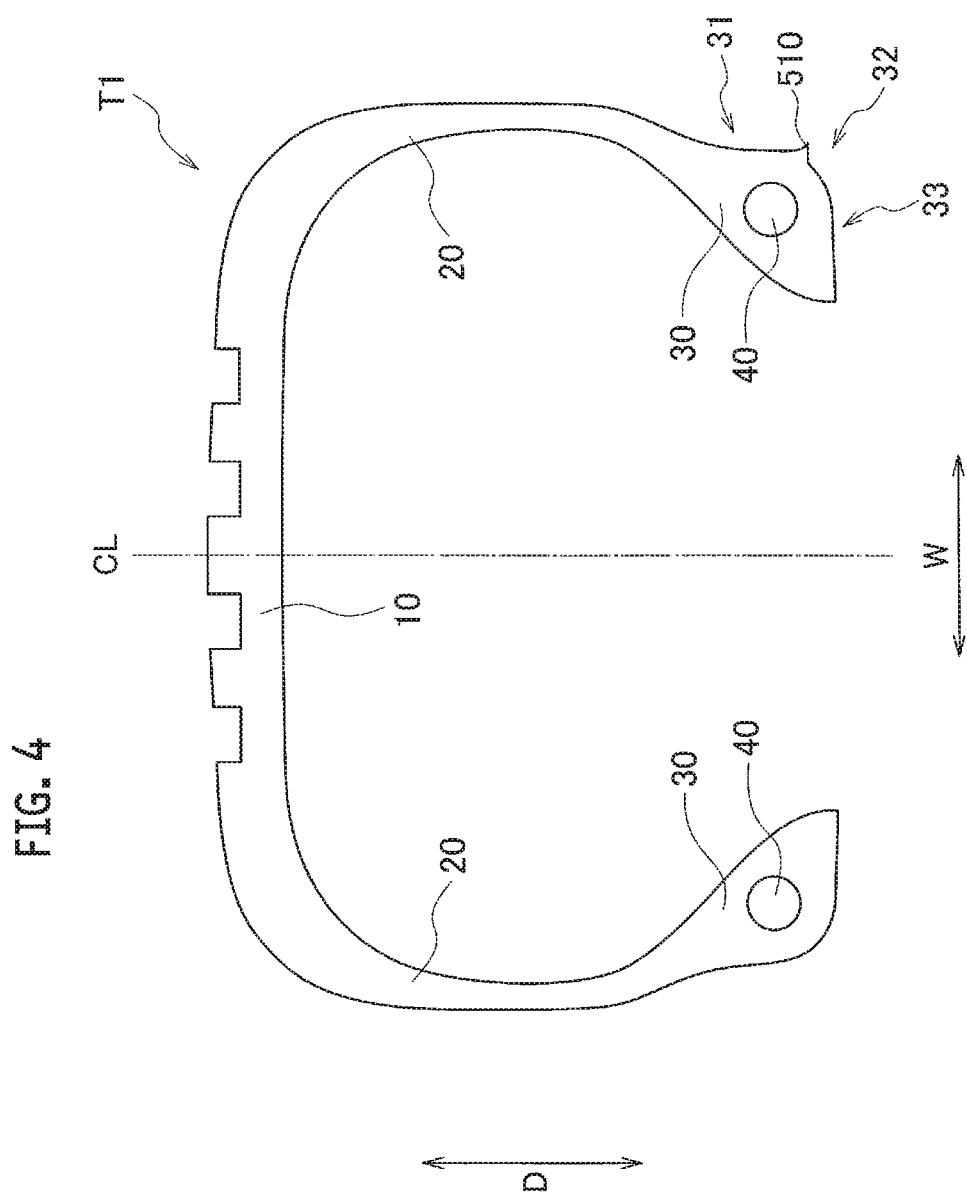

US 10,414,109 B2

TIRE VULCANIZING MOLD, TIRE MANUFACTURING METHOD, AND TIRE

CROSS REFERENCE TO RELATED APPLICATIONS

This application is a National Stage of International Application No. PCT/JP2015/050721, filed on Jan. 14, 2015, which claims priority from Japanese Patent Application No. 2014-019295, filed on Feb. 4, 2014, the contents of all of which are incorporated herein by reference in their entirety.

TECHNICAL FIELD

The present invention relates to a tire vulcanizing mold for subjecting an unvulcanized tire to vulcanization molding, a tire manufacturing method using the tire vulcanizing mold, and a tire.

BACKGROUND ART

Generally, a manufacturing process of a pneumatic tire includes a vulcanizing process for promoting a vulcanizing reaction in an unvulcanized pneumatic tire (so-called raw tire or green tire). In the vulcanizing step, an unvulcanized tire is vulcanized by using a vulcanizing apparatus provided with a tire vulcanizing mold for forming a tread part, a side wall part, a bead part or the like. Further, the tire vulcanizing mold has a bead ring for forming the bead part of the unvulcanized tire.

Here, the bead part includes an arc-shaped bead heel part formed to be protruded toward the outside in a tire width direction and therefore the bead part has a complicated shape. Thus, when the unvulcanized tire is subjected to vulcanization molding in an inner surface of the bead ring in order to vulcanize the unvulcanized tire stored in the tire vulcanizing mold, air might be sealed between the bead heel part and the bead ring without being released. In such a case, air retention called bare is generated on a tire surface and therefore appearance of the tire might be spoiled.

As a solution to this problem, a technique of discharging air by disposing a vent hole on the bead ring is utilized. However, when adopting such a technique, rubber of the unvulcanized tire is entered into the vent hole and many spews are generated on the tire surface in the vulcanizing process. Such spews are cut and removed for improving the appearance, however much time is needed for the removal operation and a part of the spews might be left without being removed. Especially, since the bead part has a complicated shape, the spew is apt to be remained, and this configuration not only spoils the appearance but also deteriorates adhesion between the beat part and a rim, and as a result of that, an air leaking of a tubeless tire might be occurred.

Further, when the bead ring is repeatedly used, a rubber crumb or a mold releasing agent is gradually stored in the vent hole, and such a configuration leads communication failure of the vent hole which prevents air from being exhausted. Thus, a washing operation of the beat ring for removing the rubber crumb is needed. Such a washing operation needs much time and deteriorates productivity because of increase of a manufacturing stopping time in accordance with the washing.

In order to solve such a problem, a tire vulcanizing mold in which a bead ring is divided and a plurality of thin plates (shim) is arranged on a divided surface of the bead ring at intervals in a tire circumferential direction is suggested (see Patent Literature 1).

According to such a tire vulcanizing mold, a gap for air bleeding can be ensured over the whole periphery of the bead ring in the tire circumferential direction without forming the vent hole, and this configuration can eliminate the need for performing the removal operation of the spew, and it is considered that productivity in manufacturing a tire can be improved.

CITATION LIST

Patent Literature

Patent Literature 1: JP 2008-37053 A

SUMMARY OF INVENTION

Technical Problem

However, as the tire vulcanizing mold disclosed in Patent Literature 1, when manufacturing a plurality of thin plates (for example, thin plate having a thickness of 0.02 to 0.08 mm) to be arranged on the divided surface of the bead ring, it is difficult to ensure processing accuracy of each thin plate. Thus, a cost in manufacturing a plurality of the thin plates is increased, and therefore a cost in manufacturing the tire vulcanizing mold is apt to be increased.

Further, in order to ensure quality of the tire such as a tire shape (for example, roundness), it is necessary to assemble the tire vulcanizing mold in a required shape. Thus, when the tire vulcanizing mold is assembled together with a plurality of the thin plates described above, it is necessary to adjust a thickness or a position of the thin plates. As a result, in the tire vulcanizing mold described above, working man-hour in manufacturing the tire may be increased and therefore production costs may be increased due to the increase of the working man-hour.

Accordingly, an object of the present invention is, in consideration of the problem described above, to provide a tire vulcanizing mold, a tire manufacturing method, and a tire capable of ensuring quality of the tire, improving operability in manufacturing the tire, and suppressing the production costs.

Solution to Problem

To solve the above mentioned problems, aspects of the present invention include following features. A first aspect according to the present invention is a tire vulcanizing mold (tire vulcanizing mold 1) configured to mold a tire (pneumatic tire T1) provided with a bead part (bead part 30) having a bead heel part (bead heel part 32) from an unvulcanized tire (unvulcanized tire T) formed as an unvulcanized pneumatic tire, comprising a side part ring (upper side part ring 200) which molds at least the bead part. One circumferential direction groove part (circumferential direction groove part 500) recessed toward an outer side in a tire width direction and extending in a tire circumferential direction is formed in a heel molding region (heel molding region A232), which molds the bead heel part, of a tire molding surface of the side part ring. The side part ring is divided into a side ring (side ring 210) arranged at an outer side in a tire radial direction and a bead ring (bead ring 220) arranged at an inner side of the side ring in the tire radial direction and contacted with the side ring. A dividing position (dividing position 200D) between a tire molding surface (side ring inner peripheral surface 211) of the side ring and a tire molding surface (bead ring inner peripheral surface 221) of the bead ring is arranged on a groove bottom (groove bottom 500) of the one circumferential direction groove part. A cross-sectional shape of the one circumferential direction groove part is formed in a tapered shape in which a groove width becomes smaller toward the groove bottom.

The tire vulcanizing mold may include a chamfered part formed on an end part of the side ring at a side of the dividing position, and the one circumferential direction groove part may be formed by the chamfered part.

The tire vulcanizing mold may be provided with another circumferential direction groove part formed on the tire molding surface of the side ring and extending in the tire circumferential direction within the heel molding region. The tire vulcanizing mold may be provided with a communicating groove part formed on the tire molding surface of the side ring, communicating with the other circumferential direction groove part and with the one circumferential direction groove part, and extending in the tire radial direction.

The tire vulcanizing mold may be provided with a cross-sectional shape of the one circumferential direction groove part formed to be away from the virtual curve line when a virtual curve line is defined along the cross-sectional shape of a normal rim at a side of a tire contact surface and is defined in a state in which the normal rim is mounted to the tire.

When the tire width direction of the tire vulcanizing mold matches with a vertical direction, the side part ring having the one circumferential direction groove part may be defined by at least an upper side part ring among the upper side part ring arranged at an upper side in the vertical direction and a lower side part ring arranged at a lower side in the vertical direction. Furthermore, the lower side part ring may be divided into another side ring arranged at the outer side in the tire radial direction and another bead ring arranged at the inner side of the other side ring in the tire radial direction and contacted with the other side ring. The tire vulcanizing mold may be provided with a dividing position formed between a tire molding surface of the other side ring and a tire molding surface of the other bead ring and arranged at an outer side of another heel molding region, which molds the other bead heel part, in the tire radial direction.

A second aspect according to the present invention is a tire manufacturing method which manufactures a tire by using a tire vulcanizing mold. The tire manufacturing method includes arranging an unvulcanized tire formed as an unvulcanized pneumatic tire in the tire vulcanizing mold (unvulcanized tire preparing step S10), and molding the tire by vulcanizing the unvulcanized tire arranged in the tire vulcanizing mold (tire vulcanizing step S20). The tire vulcanizing mold includes a side part ring which molds at least the bead part. One circumferential direction groove part recessed toward an outer side in a tire width direction and extending in a tire circumferential direction is formed in a heel molding region, which molds the bead heel part, of a tire molding surface of the side part ring. The side part ring is divided into a side ring arranged at an outer side in a tire radial direction and a bead ring arranged at an inner side of the side ring in the tire radial direction and contacted with the side ring. A dividing position between a tire molding surface of the side ring and a tire molding surface of the bead ring is arranged on a groove bottom of the one circumferential direction groove part. A cross-sectional shape of the one circumferential direction groove part is formed in a tapered shape in which a groove width becomes smaller toward the groove bottom.

A third aspect according to the present invention is a tire including a bead part provided with a bead heel part. The bead heel part has one circumferential direction projection part (circumferential direction projection part 510) protruded toward an outer side in a tire width direction and extending in a tire circumferential direction. A cross-sectional shape of the one circumferential direction projection part is formed in a tapered shape in which a width of the one circumferential direction projection part becomes smaller toward a distal end of the one circumferential direction projection part.

The bead heel part of the tire may have another circumferential direction projection part extending in the tire circumferential direction. The bead heel part of the tire may have a communicating projection part extending in the tire radial direction from the one circumferential direction projection part to the other circumferential direction projection part.

A cross-sectional shape of the one circumferential direction projection part may be formed to be away from a virtual curve line when the virtual curve line is defined along the cross-sectional shape of a normal rim at a side of a tire contact surface and is defined in a state in which the normal rim is mounted to the tire.

The tire may include a pair of the bead parts. The one circumferential direction projection part may be formed only on one of the bead parts.

Advantageous Effects of Invention

The present invention can provide a tire vulcanizing mold, a tire manufacturing method, and a tire capable of ensuring quality of the tire, improving operability in manufacturing the tire, and suppressing the production costs.

BRIEF DESCRIPTION OF DRAWINGS

FIG. 4 illustrates a cross-sectional view of a part of a tire according to the first embodiment of the present invention.

DESCRIPTION OF EMBODIMENTS

Figure 1:
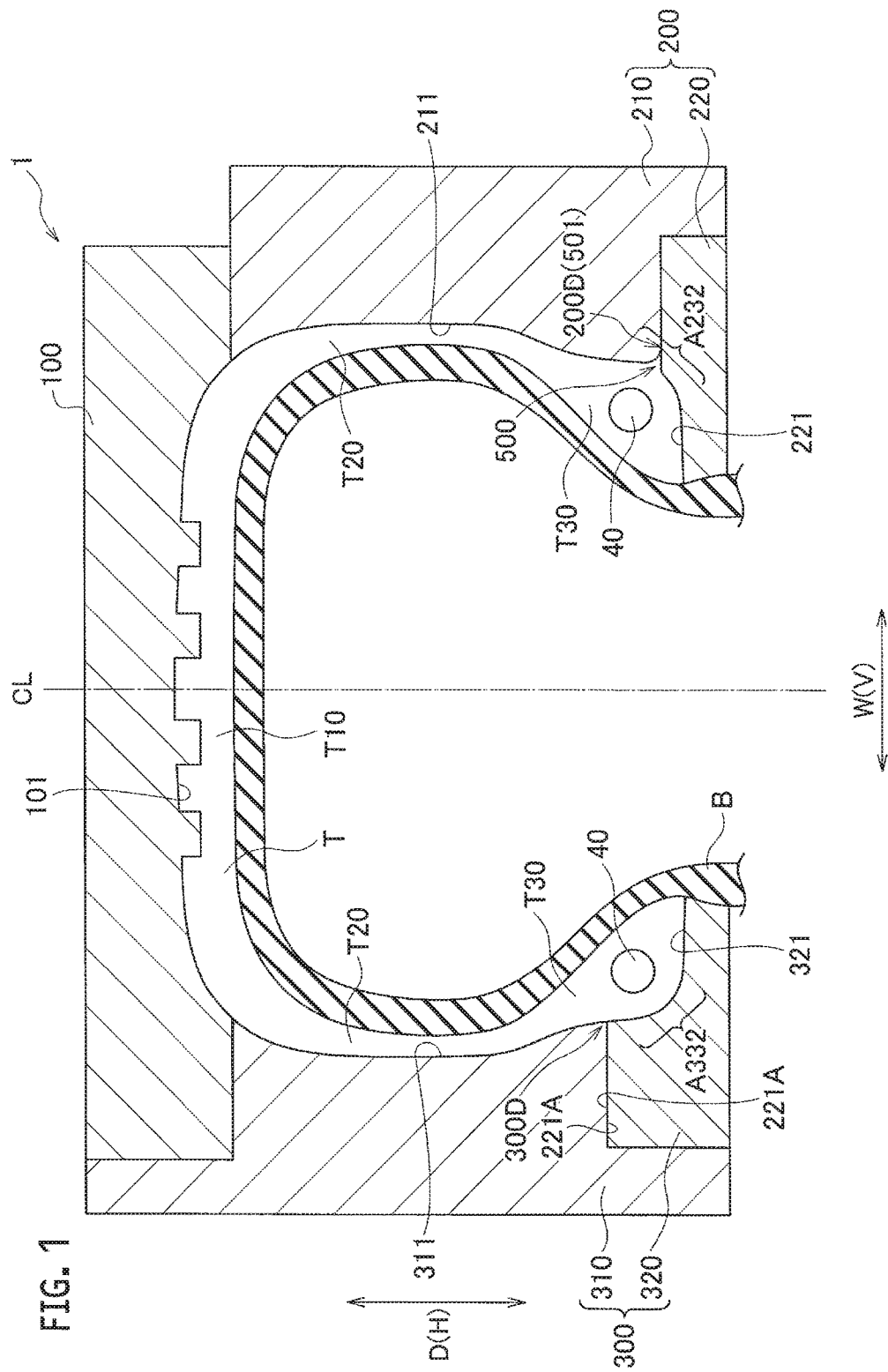
FIG. 1 illustrates a cross-sectional view of a part of a tire vulcanizing apparatus according to a first embodiment of the present invention.

Next, one embodiment of a tire vulcanizing apparatus according to the present invention is described with reference to drawings. In the description of the drawings, the same or a similar numeral reference is assigned to the same or a similar part. Further, the drawings are illustrative and the proportion in dimensions of each component shown in the drawings may be different from that of the actual component. Accordingly, specific proportion in dimensions of the component should be determined in view of the following description. Further, the proportion or the relationship in dimensions of the components may be different between the drawings.

First Embodiment (Configuration of Tire Vulcanizing Apparatus)

At first, a configuration of a tire vulcanizing apparatus according to a first embodiment of the present invention is described with reference to FIG. 1. FIG. 1 is a cross-sectional view of a part of the tire vulcanizing apparatus according to the present embodiment. As shown in FIG. 1, the tire vulcanizing apparatus is mainly provided with a tire vulcanizing mold 1 and a bladder B.

The tire vulcanizing mold 1 has a tread ring 100, and a pair of side part rings 200, 300.

When the tread ring 100 and the pair of the side part rings 200, 300 are contacted with each other, a vulcanizing chamber (also called cavity) capable of housing an unvulcanized tire T is formed inside the tire vulcanizing mold 1. Here, in the figure, an illustration of a carcass layer and a belt layer provided in the unvulcanized tire T is omitted.

The tread ring 100 has a tread inner peripheral surface 101 for molding a tread part of a pneumatic tire T1 from a tread part T10 of the unvulcanized tire T. The tread ring 100 is provided with a plurality of arc-shaped segments movable in a tire radial direction D.

The pair of the side part rings 200, 300 is provided for molding the side wall part and the bead part of the pneumatic tire by subjecting the unvulcanized tire T to vulcanization molding.

Here, when the unvulcanized tire T is subjected to the vulcanization molding, the tire vulcanizing mold 1 is arranged such that a tire width direction W matches with a vertical direction V. Thus, in FIG. 1, the side part ring 200 is served as an upper side part ring (hereinafter, referred to as upper side part ring 200) arranged at an upper side, and the side part ring 300 is served as a lower side part ring (hereinafter, referred to as lower side part ring 300) arranged at a lower side. Further, a lateral direction of FIG. 1 corresponds to the tire width direction W (vertical direction V), and a vertical direction of FIG. 1 corresponds to the tire radial direction D (horizontal direction H).

The upper side part ring 200 is divided into a side ring 210 arranged at an outer side in the tire radial direction D, and a bead ring 220 arranged at an inner side of the side ring 210 in the tire radial direction D and contacted with the side ring 210. Namely, the upper side part ring 200 has the side ring 210 and the bead ring 220.

The side ring 210 has a side ring inner peripheral surface 211 for molding a part of the side wall part and the bead part of the pneumatic tire from a part of a side wall part T20 and a bead part T30 of the unvulcanized tire T. The side ring 210 is provided with a plurality of arc-shaped segments movable in the tire width direction W.

The bead ring 220 has a bead ring inner peripheral surface 221 for molding a part of the bead part of the pneumatic tire from a part of a bead part T30 of the unvulcanized tire T. The bead ring 220 is provided with a plurality of arc-shaped segments movable in the tire width direction W. Further, the detailed configurations of the side ring 210 and the bead ring 220 are described below.

The lower side part ring 300 is divided into a side ring 310 (other side ring) arranged at the outer side in the tire radial direction D, and a bead ring 320 (other bead ring) arranged at the inner side of the side ring 310 in the tire radial direction D and contacted with the side ring 310. Namely, the lower side part ring 300 has the side ring 310 and the bead ring 320.

The side ring 310 has a side ring inner peripheral surface 311 for molding a part of the side wall part (other side wall part) and the bead part (other bead part) of the pneumatic tire. The side ring 310 is provided with a plurality of arc-shaped segments movable in the tire width direction W.

The bead ring 320 has a bead ring inner peripheral surface 321 for molding a part of the bead part (other bead part) of the pneumatic tire. The bead ring 320 is provided with a plurality of arc-shaped segments movable in the tire width direction W. Further, the detailed configurations of the side ring 310 and the bead ring 320 are described below.

The bladder B is provided for pressing the unvulcanized tire T against the tire vulcanizing mold 1, namely, the tread inner peripheral surface 101, the side ring inner peripheral surfaces 211/311, and the bead ring inner peripheral surfaces 221/321 by means of a piston or a control cylinder (not shown). The unvulcanized tire T is vulcanized while being pressed against the tire vulcanizing mold 1 by the bladder B, and the pneumatic tire T1 (see FIG. 4) is manufactured.

Further, the pneumatic tire T1 has a tread part 10, a pair of side wall parts 20, and a pair of bead parts 30 (see FIG. 4). The bead part 30 has a bead core 40 therein. The bead part 30 has a bead side part 31 arranged at the outer side in the tire radial direction D and connected to the side wall part 20, a bead seal part 33 arranged at the inner side in the tire radial direction D and contacted with a rim, and a bead heel part 32 arranged between the bead side part 31 and the bead seal part 33 so as to connect the bead side part 31 and the bead seal part 33 with each other (see FIG. 4). Further, the detailed configuration of the pneumatic tire T1 is described below.

(Configuration of Upper Side Part Ring)

Figure 2:
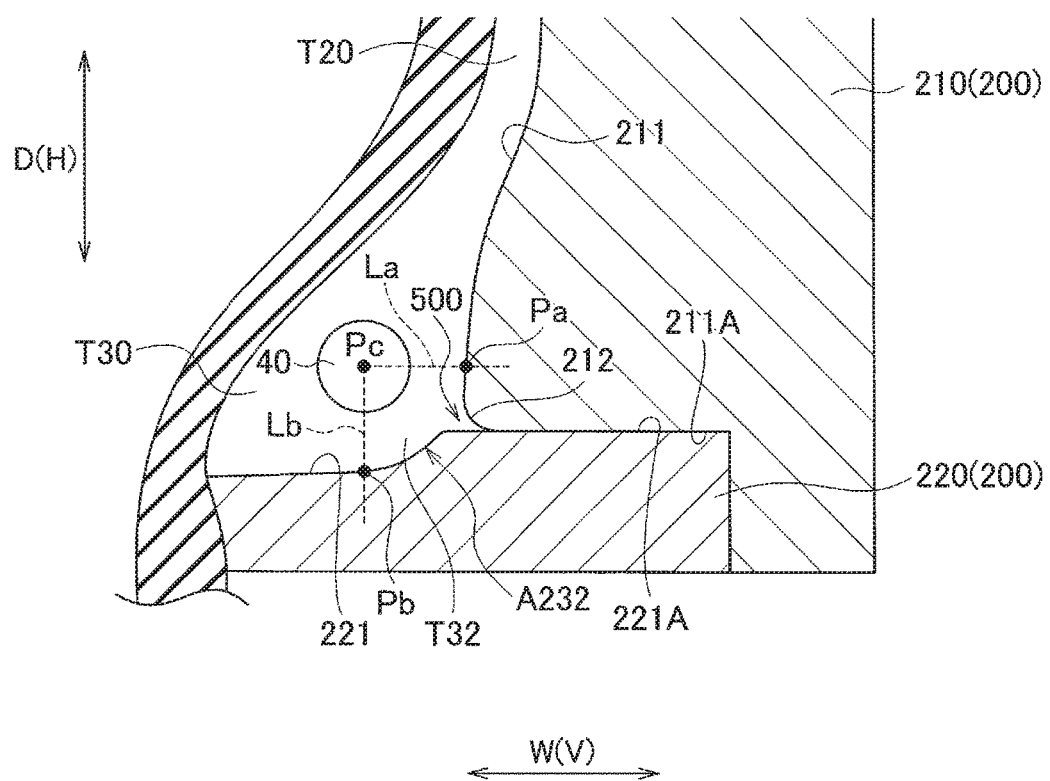
FIG. 2 illustrates a cross-sectional view of a part of a tire vulcanizing mold according to the first embodiment of the present invention.
Figure 3A:
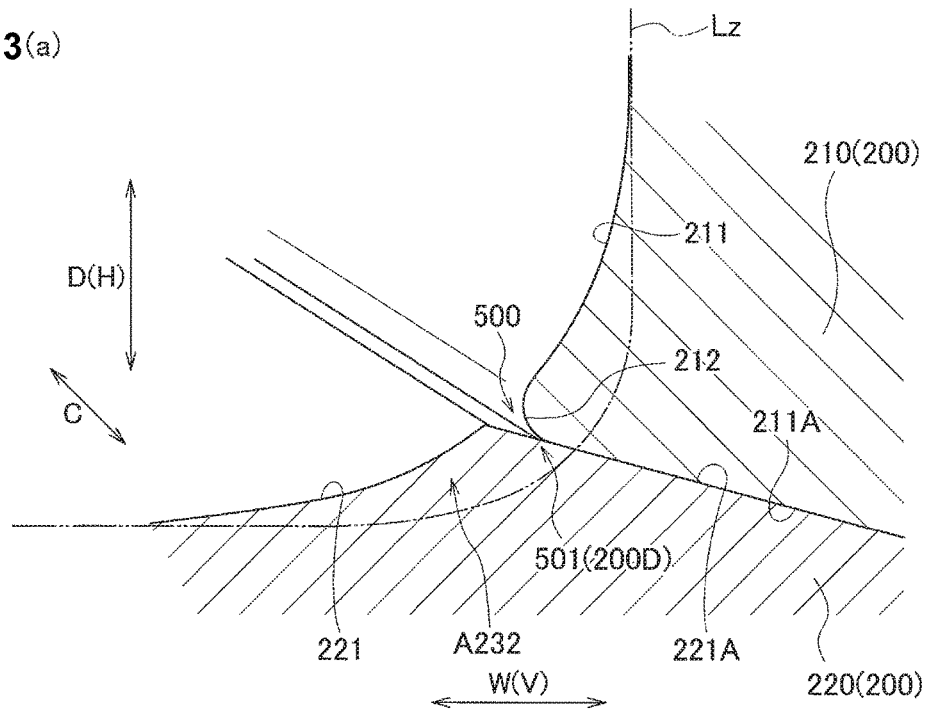
FIG. 3(a) illustrates a perspective cross-sectional view of a part of the tire vulcanizing mold according to the first embodiment of the present invention.
Figure 3B:
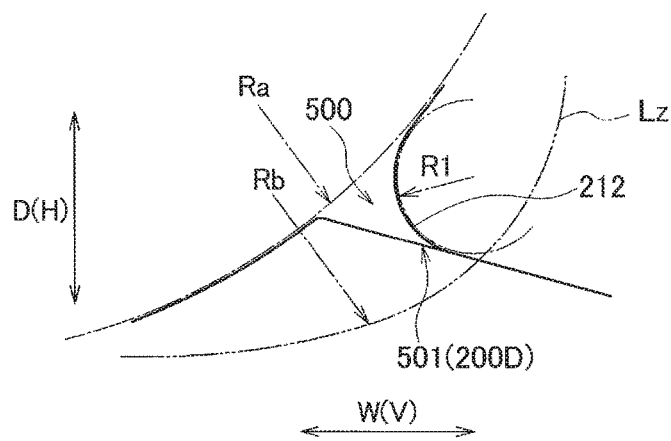
FIG. 3(b) illustrates an enlarged cross-sectional view of the tire vulcanizing mold according to the first embodiment of the present invention.

Next, a configuration of the upper side part ring described above is described with reference to FIGS. 2 and 3. FIG. 2 is a cross-sectional view of a part of the upper side part ring 200 in the tire vulcanizing mold 1 according to the present embodiment. FIG. 3(a) is a perspective cross-sectional view illustrating the upper side part ring 200 only in the tire vulcanizing mold 1 according to the present embodiment. FIG. 3(b) is an enlarged cross-sectional view of a part of the upper side part ring 200 according to the present embodiment.

The upper side part ring 200 is divided into the side ring 210 and the bead ring 220. The side ring 210 and the bead ring 220 are fitted with a small gap formed therebetween in a state in which a side ring divided surface 211A formed on the side ring 210 and a bead ring divided surface 221A formed on the bead ring 220 are contacted with each other.

Here, "fitted with a small gap formed therebetween" corresponds to being fitted without a gap which allows rubber to flow into, while air may be allowed to flow into the gap. In this case, the gap may be formed such that air is exhausted from the contact part, and further the gap may be formed such that rubber is not flowed into the gap while air is passed through the gap.

In this way, the side ring divided surface 211A and the bead ring divided surface 221A are contacted with each other in a state in which the small gap to which rubber is not flowed in and from which air is exhausted is formed. In this respect, for example, the small gap between the side ring divided surface 211A and the bead ring divided surface 221A may be formed in 0.005 to 0.08 mm. Further, the small gap between the side ring divided surface 211A and the bead ring divided surface 221A may be defined based on viscosity of rubber (Mooney viscosity).

Further, an inner peripheral surface (tire molding surface) of the upper side part ring 200 has a heel molding region A232 for molding the bead heel part 32 of the bead part 30 of the pneumatic tire T1 from the bead heel part T32 of the bead part T30 of the unvulcanized tire T. A dividing position 200D between the side ring inner peripheral surface 211 (tire molding surface) of the side ring 210 and the bead ring inner peripheral surface 221 (tire molding surface) of the bead ring 220 is arranged in the heel molding region A232.

Here, in the present embodiment, the heel molding region A232 is defined between (i) a point Pa where a virtual straight line La passing the center Pc of the bead core 40 and extending in the tire width direction W crosses the side ring inner peripheral surface 211 of the side ring 210 and (ii) a point Pb where a virtual straight line Lb passing the center Pc of the bead core 40 and extending in the tire radial direction D crossed the bead ring inner peripheral surface 221 of the bead ring 220.

In an inner peripheral surface of the upper side part ring 200 according to the present embodiment, a circumferential direction groove part 500 recessed toward the outer side in the tire width direction W and extending in a tire circumferential direction C is formed in the heel molding region A232 which molds the bead heel part 32. Here, the circumferential direction groove part 500 is continuously formed over the whole circumference in the tire circumferential direction C.

Further, in the present embodiment, the dividing position 200D between the side ring inner peripheral surface 211 (tire molding surface) of the side ring 210 and the bead ring inner peripheral surface 221 (tire molding surface) of the bead ring 220 is arranged on a groove bottom 501 of the circumferential direction groove part 500.

The side ring 210 has a chamfered part 212 on an end part of the side ring 210 at a side of the dividing position 200D. Further, the circumferential direction groove part 500 is formed by the chamfered part 212 of the side ring 210. Specifically, the circumferential direction groove part 500 is formed by a groove wall provided with the chamfered part 212 formed at the end part of the side ring 210 and an end part of the bead ring 220.

In the present embodiment, as shown in FIGS. 3(a) and 3(b), in a cross section along the tire width direction W and the tire radial direction D, a cross-sectional shape of the circumferential direction groove part 500 is formed in a tapered shape in which its width becomes smaller toward the groove bottom 501. In other words, the cross-sectional shape of the circumferential direction groove part 500 is formed in a V-shape (V-shaped groove). Further, in the present embodiment, hereinafter, a cross-sectional shape corresponds to a cross-sectional shape along the tire width direction W and the tire radial direction.

A cross-sectional shape of the chamfered part 212 may be formed in an arc shape. In a case in which the cross-sectional shape of the chamfered part 212 is formed in an arc shape, an upper limit value of a curvature radius R1 may be defined by a tire size of the pneumatic tire T1. Namely, the upper limit value of the curvature radius R1 may be defined based on a kind of a tire of the pneumatic tire T1 such as a motorcycle tire, a vehicle tire, a truck or bus tire, or a heavy load tire. For example, in a case in which the pneumatic tire T1 is formed as a motorcycle tire, the chamfered part 212 may be formed in an arc shape with the curvature radius R1 of 0.7 mm or less (namely, R-chamfer is 0.7 mm or less). On the other hand, the chamfered part 212 may be formed in an arc shape with a lower limit value of the curvature radius R1 of 0.1 mm or more (namely, R-chamfer is 0.1 mm or more).

Further, the cross-sectional shape of the chamfered part 212 is not limited to the arc shape, and may be formed in a flat shape. In this case, an upper limit value of a chamfered amount of the chamfered part 212 may be defined by the tire size of the pneumatic tire T1. For example, in a case in which the pneumatic tire T1 is formed as a motorcycle tire, the chamfered part 212 may be formed in a flat shape with the upper limit value of the chamfered amount of 0.7 mm or less (namely, C-chamfer is 0.7 mm or less). On the other hand, the chamfered part 212 may be formed in a flat shape with a lower limit value of the chamfered amount of 0.1 mm or more (namely, C-chamfer is 0.1 mm or more).

Further, as a virtual curve line Lz is defined along a cross-sectional shape of a normal rim at a side of a tire contact surface in a state in which the normal rim is mounted to the pneumatic tire T1, the cross-sectional shape of the circumferential direction groove part 500 is formed to be away from the virtual curve line Lz in a cross-sectional shape of the inner peripheral surface (tire molding surface) of the upper side part ring 200. Namely, as shown in FIGS. 3(a) and 3(b), in a state in which the normal rim is mounted to the bead part 30 of the pneumatic tire, a predetermined gap is formed between the virtual curve line Lz along the inner peripheral surface of the normal rim and a curve line along the cross-sectional shape of the circumferential direction groove part 500. Namely, the virtual curve line Lz is arranged not to cross the curve line along the cross-sectional shape of the circumferential direction groove part 500.

Specifically, as shown in FIG. 3(b), a curvature radius Ra of an arc curve line along a cross-sectional shape of the heel molding region A232 is set to be larger than a curvature radius Rb of an arc curve line along a cross-sectional shape of a rim heel part located between a rim seal part and a flange part of the normal rim. Accordingly, a predetermined region is formed between the arc curve line with curvature radius Ra and the arc curve line with curvature radius Rb in FIG. 3(b), and the cross-sectional shape of the circumferential direction groove part 500 is formed to be arranged within the predetermined region.

Further, in the present embodiment, "a state in which the normal rim is mounted" corresponds to a state in which the normal rim is mounted to the pneumatic tire and a normal load is applied to the pneumatic tire filled with air of normal internal pressure. The "normal rim" corresponds to a standard rim in applied size defined in Year Book 2008 of JATMA (Japan Automobile Tyre Manufacturers Association). In countries other than Japan, the "normal rim" corresponds to a standard rim in applied size defined in a standard described below.

The "normal inner pressure" corresponds to an air pressure specified in a tire inner pressure measuring method in 2008 JATMA Year Book. In other countries than Japan, the "normal inner pressure" corresponds to an air pressure corresponding to the air pressure in the measurement of a tire dimension, described in the below-mentioned standard.

The "normal load" corresponds to a load corresponding to a maximum load capacity in the application of a single wheel in 2008 JATMA Year Book. In other countries than Japan, the "normal load" corresponds to a maximum load (maximum load capacity) in an approved size described in the below-mentioned standard. The standards are determined by industrial standards valid in districts where a tire is manufactured or used. For instance, it is "Year Book of the Tire and Rim Association Inc." in U.S.A., and "Standards Manual of the European Tire and Rim Technical Organization" in Europe.

Further, in the present embodiment, the side part ring having the circumferential direction groove part 500 is defined by at least the upper side part ring 200 among the upper side part ring 200 arranged at the upper side in the vertical direction V and the lower side part ring 300 arranged at the lower side in the vertical direction V. Specifically, in the present embodiment, the circumferential direction groove part 500 is formed only on the upper side part ring 200 and is not formed on the lower side part ring 300.

(Configuration of Tire)

Figure 5:
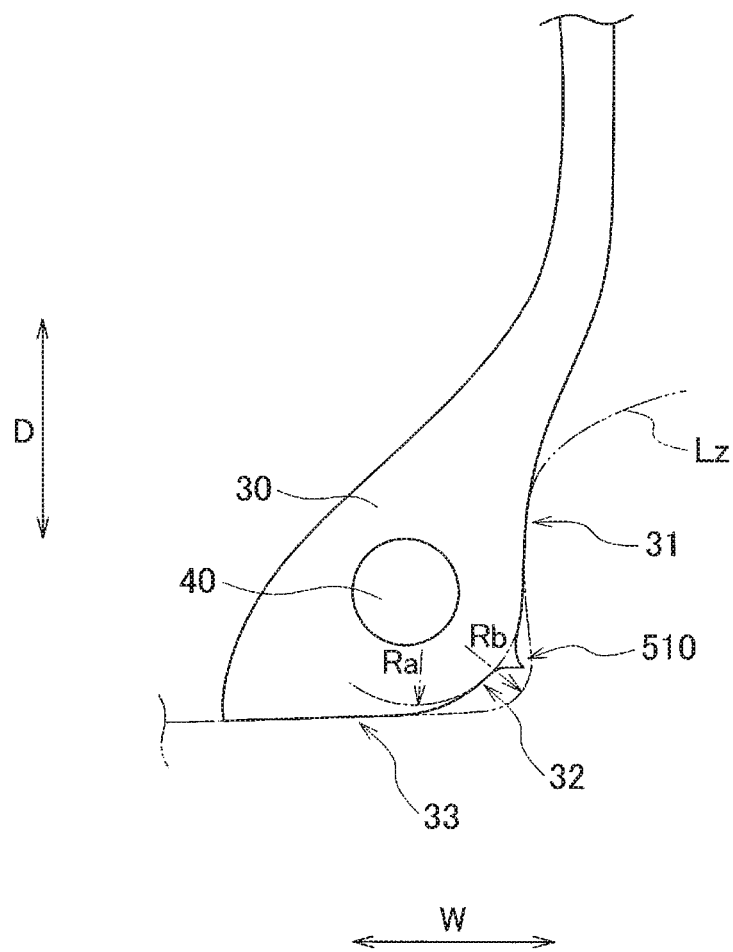
FIG. 5 illustrates an enlarged cross-sectional view of the tire according to the first embodiment of the present invention.

Next, the pneumatic tire T1 according to the present embodiment is described with reference to FIGS. 4 and 5. Specifically, the pneumatic tire T1 molded by using the tire vulcanizing mold 1 described above is described. FIG. 4 is a cross-sectional view of a part of the pneumatic tire T1 according to the present embodiment. FIG. 5 is an enlarged cross-sectional view of a part of the bead part 30 of the pneumatic tire T1 according to the present embodiment.

As shown in FIG. 4, the pneumatic tire T1 has the tread part 10, the pair of the side wall parts 20, and the pair of the bead parts 30. The bead part 30 has the bead core 40 therein.

The bead part 30 has a bead side part 31 arranged at the outer side in the tire radial direction D and connected to the side wall part 20, a bead seal part 33 arranged at the inner side in the tire radial direction D and contacted with a rim, and a bead heel part 32 arranged between the bead side part 31 and the bead seal part 33 so as to connect the bead side part 31 and the bead seal part 33 with each other. Further, a cross-sectional shape of the bead heel part 32 is formed substantially along an arc curve line with a curvature radius Ra.

The bead heel part 32 according to the present embodiment has a circumferential direction projection part 510 protruded toward an outer side in the tire width direction W and extending in the tire circumferential direction C. Here, in the present embodiment, the circumferential direction projection part 510 is formed only on one of the pair of the bead parts 30. Namely, the circumferential direction projection part 510 is not formed on another bead part 30.

A cross-sectional shape of the circumferential direction projection part 510 is formed in a tapered shape in which its width becomes smaller toward a distal end of the circumferential direction projection part 510. Namely, the cross-sectional shape of the circumferential direction projection part 510 is formed in the tapered shape similar to and corresponding to the shape of the circumferential direction groove part 500 described above.

As the virtual curve line Lz is defined along the cross-sectional shape of the normal rim at the side of the tire contact surface in a state in which the normal rim is mounted to the pneumatic tire T1, the cross-sectional shape of the circumferential direction projection part 510 is formed to be away from the virtual curve line Lz in a cross-sectional shape of the bead part 30.

Specifically, as shown in FIG. 5, the curvature radius Ra of the arc curve line along the cross-sectional shape of the heel molding region A232 is set to be larger than the curvature radius Rb of the arc curve line along the cross-sectional shape of the rim heel part located between the rim seal part and the flange part of the normal rim. Accordingly, a predetermined region is formed between the arc curve line with curvature radius Ra and the arc curve line with curvature radius Rb in FIG. 5 in the cross-sectional shape of the bead part 30, and the cross-sectional shape of the circumferential direction projection part 510 is formed to be arranged within the region between the curvature radius Ra and the curvature radius Rb.

(Configuration of Tire Manufacturing Method)

Next, a tire manufacturing method according to the present embodiment is described with reference to FIG. 6. Specifically, the tire manufacturing method which manufactures the pneumatic tire T1 by using the tire vulcanizing mold 1 described above is described.

Figure 6:
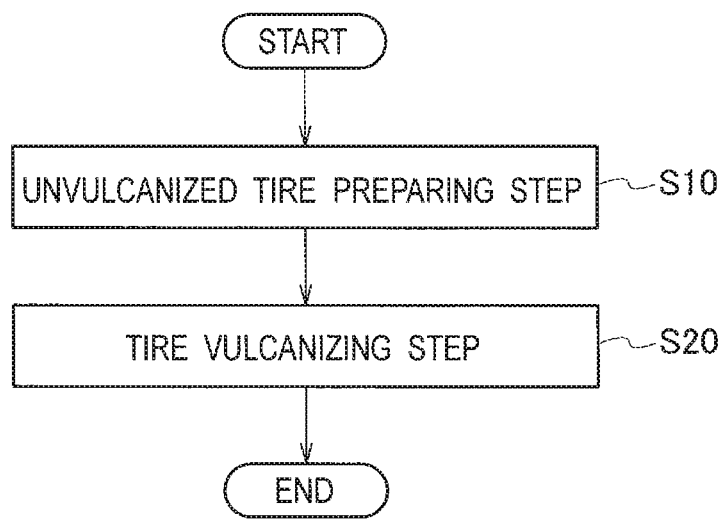
FIG. 6 is a flow chart illustrating a tire manufacturing method according to the first embodiment of the present invention.

As shown in FIG. 6, the tire manufacturing method according to the present embodiment includes an unvulcanized tire preparing step S10 of arranging the unvulcanized tire T which is an unvulcanized pneumatic tire, and a tire vulcanizing step S20 of subjecting the unvulcanized tire to the vulcanization molding.

In the unvulcanized tire preparing step S10, the unvulcanized tire T is arranged inside the tire vulcanizing mold 1. Specifically, a vulcanizing space is formed in the tire vulcanizing mold 1 when the tread ring 100, the upper side part ring 200 and the lower side part ring 300 are assembled to be fitted with each other. The unvulcanized tire T is stored in the vulcanizing space.

In the tire vulcanizing step S20, the bladder B presses the unvulcanized tire T against the tire vulcanizing mold 1 by means of a piston or a control cylinder. With this, the unvulcanized tire T is vulcanized while being pressed against the tire vulcanizing mold 1, and the pneumatic tire T1 is manufactured. After that, in the tire vulcanizing mold 1, respective segments of the tread ring 100, the upper side part ring 200, and the lower side part ring 300 are moved in a radial manner and the pneumatic tire T1 is released from the tire vulcanizing mold 1.

In this way, the pneumatic tire T1 in which the circumferential direction projection part 510 is formed on the bead heel part 32 is molded.

(Function and Effect)

As described above, the tire vulcanizing mold 1 according to the present embodiment has the upper side part ring 200. The upper side part ring 200 has the side ring 210 and the bead ring 220.

In the upper side part ring 200, the circumferential direction groove part 500 is formed in the heel molding region A232 for molding the bead heel part 32 of the pneumatic tire T1 from the bead heel part T32 of the unvulcanized tire T.

The dividing position between the side ring 210 and the bead ring 220 is arranged on the groove bottom 501 of the circumferential direction groove part 500. Further, the cross-sectional shape of the circumferential direction groove part 500 is formed in the tapered shape in which the groove width becomes smaller toward the groove bottom 501.

According to the tire vulcanizing mold 1, in the vulcanizing step, air, which is apt to be retained in the bead heel part T32 of the unvulcanized tire T, can be exhausted to the outside through the circumferential direction groove part 500 and a divided portion between the side ring 210 and the bead ring 220. Thus, since spoiling the appearance due to the bare can be suppressed, quality of the pneumatic tire T1 molded by means of the vulcanization molding can be improved.

Further, air, which is apt to be retained in the bead heel part T32, can be exhausted to the outside without forming a vent hole compared to the conventional technique. Since this configuration can eliminate the need for performing the removal operation for removing the spew and suppress the cost for the removal operation, operability in manufacturing the tire can be improved and the production costs of the tire can be suppressed.

Further, in the tire vulcanizing mold 1, since the cross-sectional shape of the circumferential direction groove part 500 is formed in the tapered shape in which the groove width becomes smaller toward the groove bottom 501, rubber entered into the circumferential direction groove part 500 is apt to enter from an opening part of the circumferential direction groove part 500 toward the groove bottom 501 without forming any gap. With this, since the air entered into the circumferential direction groove part 500 is securely forced out toward the groove bottom 501 by the rubber and exhausted to the outside, the air, which is apt to be retained in the bead heel part T32, can be securely exhausted to the outside.

Namely, the air can be exhausted to the outside without arranging a plurality of the thin plates (shims) between the side ring 210 and the bead ring 220 as in the conventional technique. Thus, according to the tire vulcanizing mold 1 according to the present embodiment, since the production cost of the tire vulcanizing mold can be suppressed by eliminating the need for manufacturing the thin plates or arranging a plurality of the thin plates, the production cost of the tire can be suppressed.

In this way, according to the tire vulcanizing mold 1 according to the present embodiment, ensuring the quality of the tire, improving the operability in manufacturing the tire, and suppressing the production cost can be achieved.

Further, in the tire vulcanizing mold 1 according to the present embodiment, the cross-sectional shape of the heel molding region A232 is formed in a substantially arc shape protruded toward the outside in the tire width direction W. Further, in the side ring 210 according to the present embodiment, the chamfered part 212 is formed on an end part of the side ring inner peripheral surface 211 at the side of the dividing position 200D.

Here, if the dividing position between the side ring inner peripheral surface 211 (tire molding surface) of the side ring 210 and the bead ring inner peripheral surface 221 (tire molding surface) of the bead ring 220 is set in the heel molding region A232 formed in the arc shape, a cross-sectional shape of an edge of the side ring 210 is formed to be a shape with a sharp angle. Thus, the edge of the side ring 210 is easily broken. In the side ring 210 according to the present embodiment, since the chamfered part 212 is formed on the end part of the side ring inner peripheral surface 211 at the side of the dividing position 200D, the side ring 210 is prevented from being broken. With this, deterioration of the quality of the tire due to the break of the side ring 210 can be prevented, and the cost for replacing the side ring 210 can be decreased.

In the tire vulcanizing mold 1 according to the present embodiment, since the cross-sectional shape of the circumferential direction groove part 500 is set to be away from the virtual curve line Lz along the tire contact surface of the normal rim, the circumferential direction projection part 510 formed on the pneumatic tire T1 by the circumferential direction groove part 500 can be formed not to be contacted with the surface of the normal rim. With this, when the pneumatic tire T1 is mounted to the normal rim, since generation of gap between a surface of the tire and a surface of the normal rim can be prevented by the circumferential direction projection part 510, leaking of air caused by deterioration of adhesion between the bead part 30 and the normal rim can be prevented.

In the tire vulcanizing mold 1 according to the present embodiment, the circumferential direction groove part 500 is formed only on the upper side part ring 200. Here, in the vulcanizing step of the unvulcanized tire T, air between the surface of the tire and the inner peripheral surface of the tire vulcanizing mold 1 is apt to move toward the upper side in the vertical direction V. Accordingly, air retention in the bead heel part 32 can be suppressed by forming the circumferential direction groove part 500 only on the upper side part ring 200 in processing to the tire vulcanizing mold 1. Namely, since air can be exhausted to the outside by the minimum processing to the tire vulcanizing mold 1, the quality of the tire can be improved while suppressing a processing cost with respect to the tire vulcanizing mold 1.

Further, in the side ring 310 arranged at the lower side in the vertical direction V, a dividing position 300D between the side ring inner peripheral surface 311 (tire molding surface) of the side ring 310 and the bead ring inner peripheral surface 321 (tire molding surface) of the bead ring 320 may be arranged at an outer side in the tire radial direction D than a heel molding region A332 (other heel molding region) for molding the bead heel part 32 (other bead heel part).

Here, in the preparing step S10 of the unvulcanized tire T, the unvulcanized tire T is stored in the tire vulcanizing mold 1, and the unvulcanized tire T is held by the side ring 310 arranged at the lower side in the vertical direction V when storing the unvulcanized tire T. Accordingly, the side ring 310 and the bead ring 320 are hardly divided by arranging the dividing position 300D between the side ring 310 and the bead ring 320 at the outer side in the tire radial direction D than the heel molding region A332. This configuration facilitates holding of the unvulcanized tire T, and therefore operability in storing the unvulcanized tire T can be improved.

Modified Example

Figure 7:
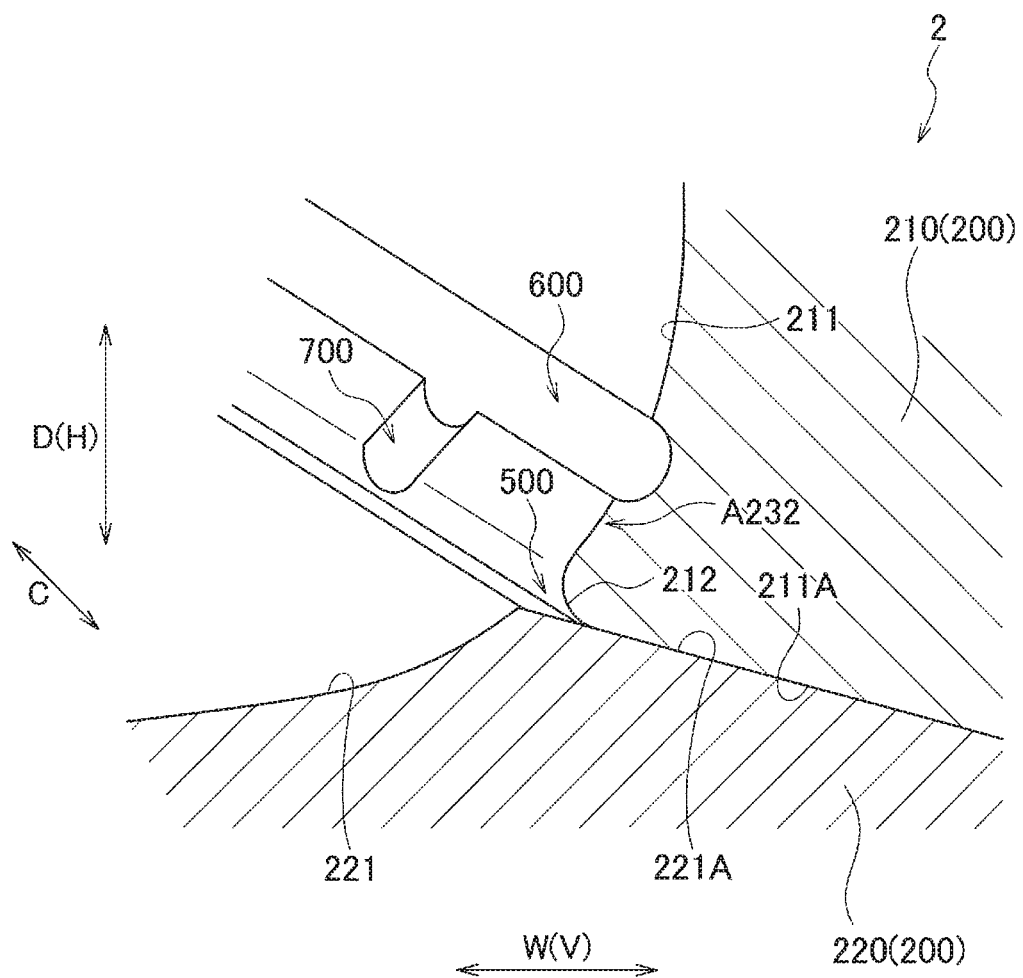
FIG. 7 illustrates a perspective cross-sectional view of a part of the tire vulcanizing mold according to a modified example of the present invention.
Figure 8:
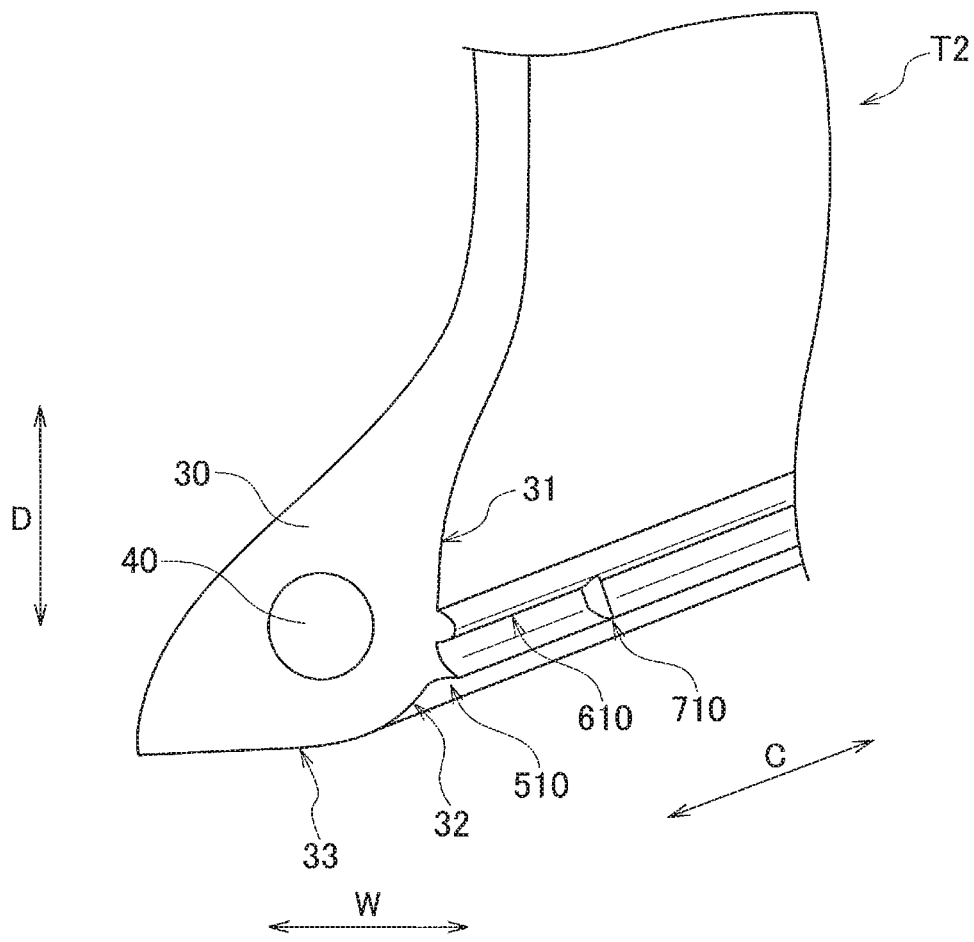
FIG. 8 illustrates a perspective cross-sectional view of a part of the tire according to the modified example of the present invention.

Next, a modified example according to the first embodiment described above is described with reference to FIGS. 7 and 8. FIG. 7 is a perspective cross-sectional view of a part of a tire vulcanizing mold 2 according to the modified example. FIG. 8 is a perspective cross-sectional view of a part of a pneumatic tire T2 molded by the tire vulcanizing mold 2 according to the modified example.

In a side ring inner peripheral surface 211 (tire molding surface) of a side ring 210 according to the present embodiment, a circumferential direction groove part 600 (other circumferential direction groove part) extending in a tire circumferential direction C, and a communicating groove part 700 communicated with the circumferential direction groove part 600 and a circumferential direction groove part 500 and extending in a tire radial direction D are formed in a heel molding region A232.

The circumferential direction groove part 600 is arranged at an outer side in the tire radial direction D than the circumferential direction groove part 500. Further, the communicating groove part 700 may be provided by a plurality of groove parts arranged at a predetermined interval in the tire circumferential direction C.

Further, in FIG. 7, a cross-sectional shape of the circumferential direction groove part 600 is formed in an arc shape as one aspect, however the cross-sectional shape of the circumferential direction groove part 600 may be formed in a tapered shape (V-shape) in which a groove width becomes smaller toward a groove bottom.

Further, a plurality of the circumferential direction groove parts 600, and a plurality of the communicating groove parts 700, each of the communicating groove parts 700 is communicated with each of the circumferential direction groove parts 600 and the circumferential direction groove part 500, may be formed in the heel molding region A232.

Next, a pneumatic tire T2 molded by using the tire vulcanizing mold 2 described above is described. As shown in FIG. 8, in the pneumatic tire T2 according to the present embodiment, a bead heel part 32 has a circumferential direction projection part 610 (other circumferential direction projection part) extending in the tire circumferential direction C, and a communicating projection part 710 extending in the tire radial direction D from the circumferential direction projection part 610 to the circumferential direction projection part 510.

A cross-sectional shape of the circumferential direction projection part 610 is formed in an arc shape so as to correspond to the cross-sectional shape of the circumferential direction groove part 600 described above. Further, the communicating projection part 710 may be provided by a plurality of projection parts arranged at predetermined intervals in the tire circumferential direction C.

Further, in the present embodiment, the circumferential direction projection part 610 is formed only on one of a pair of bead parts 30. Namely, the circumferential direction projection part 610 is not formed on another bead part 30 but on the bead part 30 on which the circumferential direction projection part 510 is formed.

As described above, in the tire vulcanizing mold 2 according to the present embodiment, since the circumferential direction groove part 600 and the communicating groove part 700 are formed in the heel molding region A232, air entered into the circumferential direction groove part 600 can be also exhausted to the outside via the communicating groove part 700 and the circumferential direction groove part 500. Accordingly, the air entered into not only the circumferential direction groove part 500 but also the circumferential direction groove part 600 can be exhausted to the outside. With this, since air, which is apt to be retained in a bead heel part T32 of an unvulcanized tire T, is securely exhausted to the outside, deterioration of quality of the tire due to bare generated by air can be more securely prevented.

Further, in view of securely exhausting of the air to the outside, a depth of the circumferential direction groove part 600 and a depth of the communicating groove part 700 may be the same depth as that of the circumferential direction groove part 500.

Other Embodiments

As described above, the contents of the present invention is disclosed by way of the embodiments of the present invention, however the description and the drawings forming a part of this disclosure should not be understood as limiting the present invention.

In the first embodiment, the circumferential direction groove part 500 is formed only on the upper side part ring 200 as one aspect. However, the circumferential direction groove part 500 may be formed not only on the upper side part ring 200 but also in the heel molding region A332 (other heel molding region) of the lower side part ring 300. In this case, in the side ring 310 arranged at the lower side in the vertical direction V, the dividing position 300D between the side ring inner peripheral surface 311 (tire molding surface) of the side ring 310 and the bead ring inner peripheral surface 321 (tire molding surface) of the bead ring 320 may be arranged on the groove bottom 501 of the circumferential direction groove part 500.

Further, in the first embodiment, the tire vulcanizing mold 1 has the tread ring 100, the upper side part ring 200, and the lower side part ring 300 as one aspect. However, the tire vulcanizing mold 1 may be provided with the upper side part ring 200 and the lower side part ring 300 without the tread ring 100. In this case, the tread part 10 of the pneumatic tire T1 is molded by a part of the upper side part ring 200 and a part of the lower side part ring 300 from the tread part T10 of the unvulcanized tire T. Further, in this case, a dividing position between an inner peripheral surface (tire molding surface) of the upper side part ring 200 and an inner peripheral surface (tire molding surface) of the lower side part ring 300 may be formed on a tire equatorial plane CL. Further, in this case, the circumferential direction groove part may be formed on both of the upper side part ring 200 and the lower side part ring 300.

In the first embodiment, the upper side part ring 200 is divided into the side ring 210 and the bead ring 220 as one aspect. However, the side ring 210 may be further divided into a plurality of rings, and the bead ring 220 may be further divided into a plurality of rings.

From this disclosure, various substitute embodiments, examples and operation techniques shall be reveled for a person skilled in the art. Accordingly, the scope of the present invention is defined only by matters used to specify the invention according to the claim which is appropriate from the above description.

Example

Next, in order to further clarify the effects of the present invention, a test result of the pneumatic tires vulcanized and molded by using the tire vulcanizing mold according to comparative examples and examples is described. Here, the present invention is not limited to such examples.

Firstly, configurations of comparative examples 1 to 5 and examples 1 and 2 are described. In the comparative example 1, a tire vulcanizing mold in which only a predetermined number of vent holes are formed is used.

In the second comparative example, a tire vulcanizing mold in which the circumferential direction groove part, and a predetermined number of vent holes formed on the groove bottom of the circumferential direction groove part are formed is used.

In the third comparative example, a tire vulcanizing mold in which only a predetermined number of vent holes are formed is used. Here, in the third comparative example, the number of the vent holes in the tire vulcanizing mold is larger than that in the first comparative example.

In the fourth comparative example, a tire vulcanizing mold in which a circumferential direction groove part, and a slit-like vent hole extending in the tire radial direction and communicated with the circumferential direction groove part are formed is used.

In the fifth comparative example, a tire vulcanizing mold in which the dividing position between the side ring and the bead ring is arranged in the heel molding region is used.

In the example 1, the tire vulcanizing mold shown in FIGS. 1 to 3 is used. Specifically, in the example 1, the tire vulcanizing mold in which the circumferential direction groove part is formed in the heel molding region and the dividing position between the side ring and the bead ring is arranged on the groove bottom of the circumferential direction groove part is used.

In the example 2, the tire vulcanizing mold shown in FIG. 7 is used. Specifically, the tire vulcanizing mold in which another circumferential direction groove part and the communicating groove part are further formed in the heel molding region in addition to the configuration of the example 1 is used.

Based on the comparative examples 1 to 5, and the examples 1 and 2, a cost, a cleaning frequency (maintenance frequency), a defect occurrence rate (bare) are comparatively evaluated. Further, the defect occurrence rate is calculated based on a number of bares generated on the pneumatic tire. The comparative result is shown in Table 1. Further, in Table 1, each comparative result is represented by an index value with respect to the reference value (100) defined by the result of the comparative example 1.

TABLE 1

|  | Mold Processing Cost | Spew Cutting Cost | Spew Disposal Cost | Vent Hole Cleaning Frequency | Defect Occurrence Rate |
|---|---|---|---|---|---|
| Comparative Example 1 | 100 | 100 | 100 | 100 | 100 |
| Comparative Example 2 | 105 | 100 | 100 | 100 | 90 |
| Comparative Example 3 | 110 | 200 | 200 | 100 | 70 |
| Comparative Example 4 | 150 | 0 | 0 | 250 | 80 |
| Comparative Example 5 | 80 | 0 | 0 | 0 | 30 |
| Example 1 | 83 | 0 | 0 | 0 | 5 |
| Example 2 | 85 | 0 | 0 | 0 | 0 |

According to the result, the pneumatic tires vulcanized and molded by the tire vulcanizing molds according to the examples 1 and 2 are superior in all of the cost, the cleaning frequency, and the defect occurrence rate compared to the pneumatic tires vulcanized and molded by the tire vulcanizing molds according to the comparative examples 1 to 4.

The pneumatic tires vulcanized and molded by the tire vulcanizing molds according to the examples 1 and 2 are superior in the defect occurrence rate compared to the pneumatic tire vulcanized and molded by the tire vulcanizing mold according to the comparative example 5.

Namely, it is proved that the tire vulcanizing mold according to the present invention can ensure quality of the tire, improve operability in manufacturing the tire, and suppress a production cost.

It should be noted that the present application claims priority to Japanese Patent Application No. 2014-019295, filed on Feb. 4, 2014, the entire contents of which are incorporated by reference herein.

INDUSTRIAL APPLICABILITY

The present invention can provide a tire vulcanizing mold, a tire manufacturing method, and a tire capable of ensuring quality of the tire, improving operability in manufacturing the tire, and suppressing the production costs.

REFERENCE SIGNS LIST 1, 2 TIRE VULCANIZING MOLD
10 TREAD PART
20 SIDE WALL PART
30 BEAD PART
31 BEAD SIDE PART
32 BEAD HEEL PART
33 BEAD SEAL PART
40 BEAD CORE
100 TREAD RING
200 UPPER SIDE PART RING
200D DEVIDED POSITION
210 SIDE RING
220 BEAD RING
300 LOWER SIDE PART RING
300D DIVIDING POSITION
310 SIDE RING
320 BEAD RING
500 CIRCUMFERENTIAL DIRECTION GROOVE PART
501 GROOVE BOTTOM
510 CIRCUMFERENTIAL DIRECTION PROJECTION PART
A232 HEEL MOLDING REGION
A332 HEEL MOLDING REGION
B BLADDER
T1, T2 PNEUMATIC TIRE
T UNVULCANIZED TIRE
T10 TREAD PART
T20 SIDE WALL PART
T30 BEAD PART
T32 BEAD HEEL PART

The invention claimed is:

1. A tire vulcanizing mold configured to mold a tire provided with a pair of bead parts each having a bead heel part from an unvulcanized tire formed as an unvulcanized pneumatic tire, comprising a pair of side part rings which mold at least the pair of bead parts, wherein
    one circumferential direction groove part recessed toward an outer side in a tire width direction and extending in a tire circumferential direction is formed in a heel molding region, which molds one bead heel part, of a tire molding surface of one of the pair of side part rings,
    the one of the pair of side part rings is divided into a side ring arranged at an outer side in a tire radial direction and a bead ring arranged at an inner side of the side ring in the tire radial direction and contacted with the side ring,
    a dividing position between a tire molding surface of the side ring and a tire molding surface of the bead ring is arranged on a groove bottom of the one circumferential direction groove part,
    a cross-sectional shape of the one circumferential direction groove part is formed in a tapered shape in which a groove width becomes smaller toward the groove bottom,
    wherein when the tire width direction of the tire vulcanizing mold matches with a vertical direction, the pair of side part rings include an upper side ring arranged at an upper side in the vertical direction and a lower side part ring arranged at a lower side in the vertical direction, and the one circumferential direction groove part is formed at least on the upper side part ring,
    wherein the lower side part ring is divided into another side ring arranged at the outer side in the tire radial direction and another bead ring arranged at the inner side of the other side ring in the tire radial direction and contacted with the other side ring, and
    wherein a dividing position between a tire molding surface of the other side ring and a tire molding surface of the other bead ring is arranged at an outer side of another heel molding region, which molds another bead heel part, in the tire radial direction.

2. The tire vulcanizing mold according to claim 1, wherein a chamfered part is formed on an end part of the side ring at a side of the dividing position, and
the one circumferential direction groove part is formed by the chamfered part.

3. The tire vulcanizing mold according to claim 1, wherein another circumferential direction groove part extending in the tire circumferential direction within the heel molding region, and a communicating groove part communicating with the other circumferential direction groove part and the one circumferential direction groove part and extending in the tire radial direction are formed on the tire molding surface of the side ring.

4. The tire vulcanizing mold according to claim 1, wherein the cross-sectional shape of the one circumferential direction groove part is formed to be away from a virtual curve line when the virtual curve line is defined along the cross-sectional shape of a normal rim at a side of a tire contact surface and is defined in a state in which the normal rim is mounted to the tire.

* * * * *